United States Patent

[11] 3,588,705

[72] Inventors T. O. Paine
Administrator of the National Aeronautics and Space Administration with respect to an invention of;
Frank J. Loch; William M. Conrad, Houston, Tex.
[21] Appl. No. 875,849
[22] Filed Nov. 12, 1969
[45] Patented June 28, 1971

[54] FREQUENCY-MODULATION DEMODULATOR THRESHOLD EXTENSION DEVICE
11 Claims, 6 Drawing Figs.

[52] U.S. Cl. .......... 325/348, 325/347, 325/348, 325/473, 325/478, 325/480, 325/482, 329/145, 328/164, 328/165
[51] Int. Cl. .......... H04b 1/06
[50] Field of Search .......... 179/1 (P); 329/145; 340/169, 171, 172; 325/45, 46, 47, 65, 344, 349, 473, 474, 478, 480, 482, 487, 488, 348; 328/162—165, 167

[56] References Cited
UNITED STATES PATENTS

| | | | |
|---|---|---|---|
| 2,822,466 | 2/1958 | Newman | 328/165 |
| 3,495,244 | 2/1970 | La Rosa | 325/473 |

*Primary Examiner*—Robert L. Griffin
*Assistant Examiner*—Albert J. Mayer
*Attorneys*—Marvin J. Marnock, Marvin F. Matthews and G. T. McCoy

ABSTRACT: A threshold extension device is connected between the output of a frequency-modulation demodulator and the input of the customary demodulator output filter for purposes of minimizing the occurrence of impulse noise, usually referred to as "click" noise, at the output of the output filter. The device includes a click-eliminating signal transfer channel having a follow and hold circuit. The device also includes amplitude-sensitive click detector circuitry for detecting the occurrence of a click-type noise impulse and switching the follow and hold circuit to the hold condition, whereby the signal transferred to the output filter is held at the last previous nonclick value during the occurrence of the click impulse.

Patented June 28, 1971 3,588,705

2 Sheets-Sheet 1

Frank J. Loch
William M. Conrad
INVENTORS

BY
ATTORNEYS

Frank J. Loch
William M. Conrad
INVENTORS

BY [signature]
M. J. Mornock [signature]
ATTORNEYS

FREQUENCY-MODULATION DEMODULATOR THRESHOLD EXTENSION DEVICE

ORIGIN OF THE INVENTION

The invention described herein was made in the performance of work under a NASA Contract and is subject to the provisions of Section 305 of the National Aeronautics And Space Act of 1958, Public Law 85—568 (72 Stat. 435; 42 U.S.C. 2457).

BACKGROUND OF THE INVENTION

This invention relates to frequency-modulation demodulators and to means for improving the operating performance of such demodulators for input signals having relatively low signal-to-noise ratios.

Frequency-modulation communication receivers are sometimes employed to receive extremely weak incoming frequency-modulated radio signals and to recover therefrom the intelligence or information originally transmitted from a distant frequency-modulated radio transmitter. A good example of this occurs for the case of the down-link or spacecraft-to-earth portion of a spacecraft frequency-modulation communication system where the spacecraft is at a lunar distance or greater with respect to a groundstation receiver located on the earth. Space limitations aboard the spacecraft necessitate that the transmitter aboard the spacecraft be of the relatively low power type. This, together with the vast intervening distance separating the spacecraft and groundstation receiver, causes the radio signal received at the groundstation to be extremely weak. In order to recover the desired intelligence with a minimum of degradation, the groundstation receiver must be capable of processing a relatively weak signal without superimposing thereon any appreciable amount of electrical circuit noise.

One of the factors having a substantial effect on the performance of a frequency-modulation communication receiver for the case of a weak received signal is the operating performance of the frequency-modulation demodulator or demodulators used in such receiver. As the received signal becomes weaker, a threshold point is reached below which the frequency-modulation demodulator begins to introduce electrical noise at a greater rate. In addition, the form of the added noise is of a much more noticeable and objectionable character.

SUMMARY OF THE INVENTION

It is an object of the invention, therefore, to provide a new and improved device for use with frequency-modulation demodulators for improving the performance of frequency-modulation communication receivers for relatively weak received signals.

It is another object of the invention to provide a new and improved device for use with frequency-modulation demodulators for extending the normal operating range of such demodulators to include lower values of input signal-to-noise ratio.

In accordance with the invention, there is provided a frequency-modulation demodulator threshold extension device for the intermediate the output of a frequency-modulation demodulator and the input of a demodulator output filter. SUch device includes first circuit means adapted to be coupled to the output of the frequency-modulation demodulator and having a first operating mode for transferring the demodulated signal to a demodulator output filter and having a second operating mode for discontinuing the transfer of the actual signal and instead transferring an estimated signal value based on a previous value of the actual signal. The device further includes second circuit means adapted to be coupled to the output of the frequency-modulation demodulator for detecting the occurrence of demodulator click impulses and switching the first circuit means to its second operating mode during the occurrence of each such impulse.

For a better understanding of the present invention together with other and further objects and features thereof, reference is had to the following description taken in connection with the accompanying drawings, the scope of the invention being pointed out in the appended claims.

BRIEF DESCRIPTION OF THE DRAWINGS

Referring to the drawings.

DESCRIPTION OF THE PREFERRED EMBODIMENTS

Figure 1:
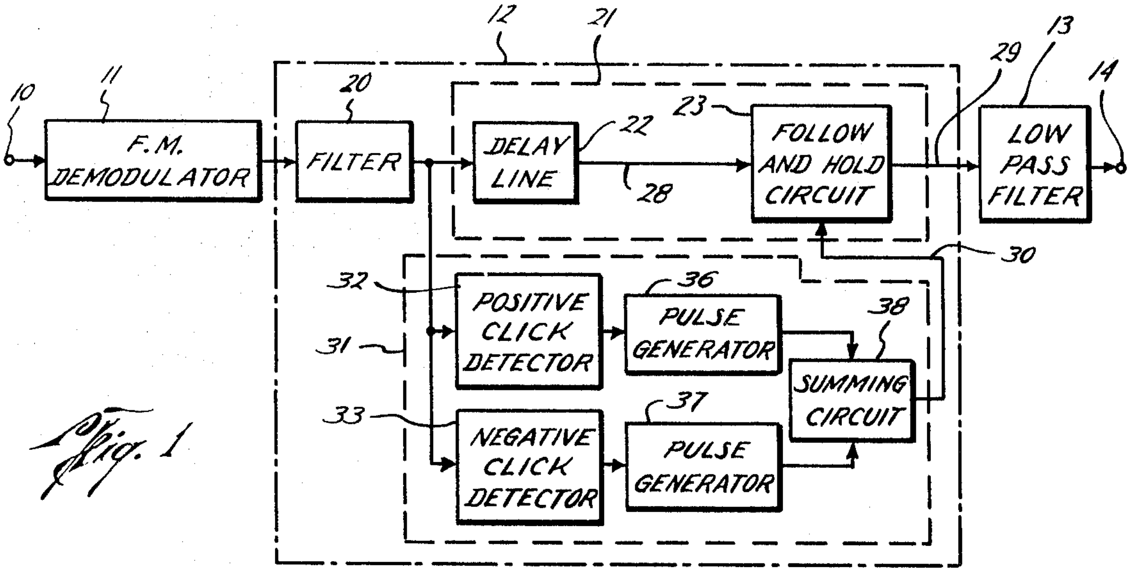
FIG. 1 is a block diagram of a portion of a frequency-modulation communication receiver showing in use therein a representative embodiment of a threshold extension device constructed in accordance with the present invention.

Referring to FIG. 1, a transmitted frequency-modulated radio signal is intercepted by a receiving antenna system and is processed by the front end portion of a communication receiver to produce an intermediate-frequency replica thereof. Such intermediate-frequency signal is supplied by way of a terminal 10 to the input of a frequency-modulation demodulator 11. The demodulator 11 separates the modulation portion of the composite signal from the carrier portion and supplies the recovered modulation signal by way of a threshold extension device 12 to a demodulator output filter 13. Filter 13 is of the low-pass type normally connected directly to the output of a frequency-modulation demodulator. Among other things, filter 13 functions in the usual manner to minimize the Gaussian-type noise normally mixed with the desired signal. The output signal from filter 13 is supplied by way of terminal 14 to the remainder of the communication receiver.

Figure 2:
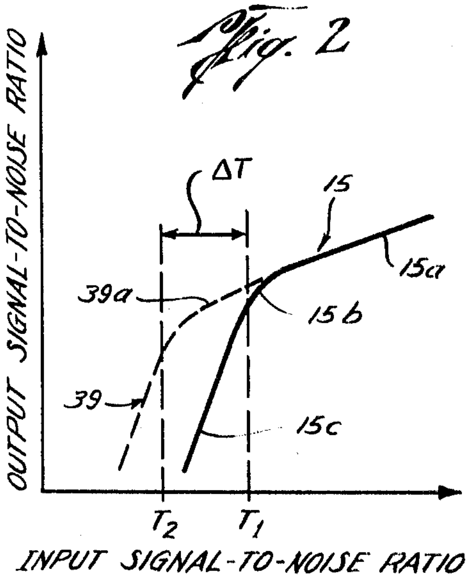
FIG. 2 is a graph used in explaining the operation of a frequency-modulation demodulator.

It will be assumed for the moment that the threshold extension device 12 is not present and that the output filter 13 is connected directly to the output of the demodulator 11. In this case, the performance of the demodulator 11 together with the filter 13 is of the character indicated by solid-line curve 15 of the graph of FIG. 2. The horizontal axis of the graph is plotted in terms of input signal-to-noise ratio (in decibels) at the terminal 10, while the vertical axis is plotted in terms of the output signal-to-noise ratio (in decibels) at the terminal 14. The upper portion *15a* of the transfer curve 15 represents the lower end of the normal operating range of the conventional demodulator system (demodulator 11 plus filter 13). As the input signal-to-noise ratio decreases, a region *15b* is reached at which the curve 15 takes a sharp downward turn. The lower portion *15c* of the curve is of considerably greater slope, which is indicative of the fact that the demodulator 11 is introducing electrical noise at an increased rate.

For purposes of evaluation, the threshold level separating the normal operating range from the degraded range may be defined as that input signal-to-noise ratio level at which the output signal-to-noise ratio level is exactly one decibel below a linear extension of the normal portion of the input-output transfer curve. This threshold level for the conventional demodulator system represented by curve 15 is designated as $T_1$ in FIG. 2.

Figure 3A:
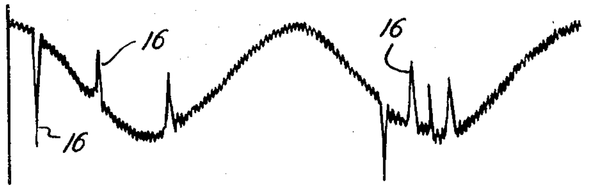
FIGS. 3A and 3B illustrate typical signal waveforms associated with a frequency-modulation demodulator for the case of a relatively weak received signal.

Below the threshold, something occurs which degrades the performance of the demodulator system. A primary part of this something is the generation of click-type noise impulses. FIG. 3A shows a typical signal waveform for the signal at the output terminal 14 for the case where the input signal-to-noise ratio is below the $T_1$ threshold and the threshold extension device 12 is not used. In the absence of noise, this output signal would be a pure sine wave. Some Gaussian-type noise is inevitably present, hence the low level fuzziness superimposed on the sine wave. In addition, however, there is further superimposed on the filter output signal the click-type noise impulses just mentioned, typical ones of these impulses being indicated at 16 in FIG. 3A.

These click impulses 16 are spurious noise impulses which are generated by the demodulation process itself. Such impulses are a result of the interaction between the randomly varying electrical noise and the signal at the input of the demodulator 11. When operating below the threshold level, the signal amplitude is of the same order of magnitude as some of the random noise fluctuations. As a result, the noise vector will sometimes combine with the signal vector to produce a sudden 360° phase excursion for the resultant signal-plus-noise vector. This sudden change in phase is detected by the demodulator 11 and produces at the output thereof one of the undesired click impulses 16. Unfortunately, these click impulses have a substantial low-frequency content and are not suppressed by the conventional output filter 13. Hence, their presence in the output signal of FIG. 3A.

Looking at FIG. 3A, it would appear to be next to impossible to devise a method for removing very many of the noise impulses 16. Many of them ride down in the valleys of the sine wave and, hence, there would appear to be no easy way of reaching them without doing damage to the sine wave itself. A solution to this impasse has, however, been found. This solution turns on a recognition and appreciation of the character of the demodulated signal before it is supplied to the output filter 13.

Figure 3B:
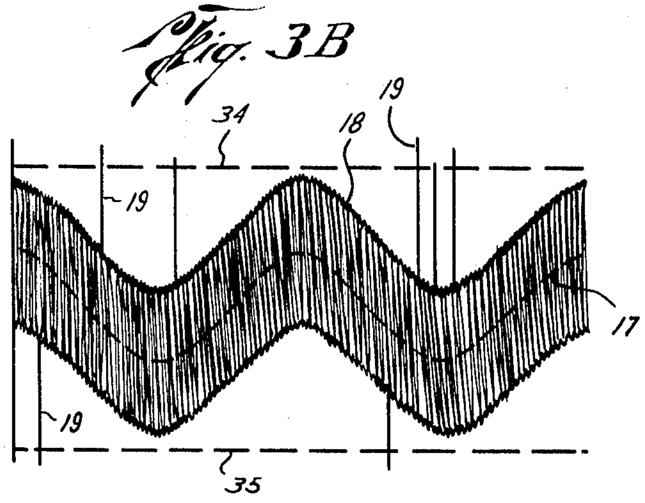

Referring to FIG. 3B, there is shown the signal appearing at the output of the demodulator 11 which gives rise to the filtered signal of FIG. 3A. In FIG. 3B, the desired sinusoidal signal component is indicated at 17, the envelope of the Gaussian noise is indicated at 18 and the click-type noise impulses are indicated at 19. For this signal, the peak amplitude of the click-type noise impulses is, in most cases, greater than the combined amplitude of both the recovered modulation signal and the Gaussian noise. Thus, the occurrence of a click impulse 19 can be determined by means of amplitude detection.

An input matched filter 20, allows a click impulse to reach full amplitude while significantly reducing Gaussian noise amplitude. Following the matched filter 20, the occurrence of a click impulse 19 can be readily determined by means of amplitude detection. The signal shown in FIG. 3B is actually the signal appearing at the output of this filter 20.

Returning now to FIG. 1, the details of the threshold extension device 12 will now be considered. The device 12 includes a click-eliminating signal transfer channel which is connected to the output of the demodulator 11 and which has a first operating mode for transferring the demodulated signal to the demodulator output filter 13 and a second operating mode for discontinuing the transfer of the actual signal and instead transferring an estimated signal value based on a previous value of the actual signal. This signal transfer channel includes the input matched filter 20 and click eliminator circuitry 21. Click eliminator circuitry 21 includes a delay line 22 and a follow and hold circuit 23. Filter 20 is a low-pass type of filter for passing only frequencies below an upper cutoff frequency. Filter 20 differs from the conventional output filter 13 in that the cutoff frequency of filter 20 is just high enough to allow clicks to reach full amplitude before they end. This is known as a matched filter. Filter 20 removes high-frequency Gaussian noise type impulses from the demodulated signal so that impulses of this type will not be mistaken as click-type noise impulses, while click impulses are allowed to reach full amplitude. Delay line 22 provides a small amount of time delay to allow for the click impulse to reach full amplitude in the matched filter 20. The delay line 22 time is equal to the rise time of the matched filter 20. The primary unit in the click eliminator channel is the follow and hold circuit 23. The basic elements of a typical follow and hold circuit are indicated in FIG. 4.

Figure 4:
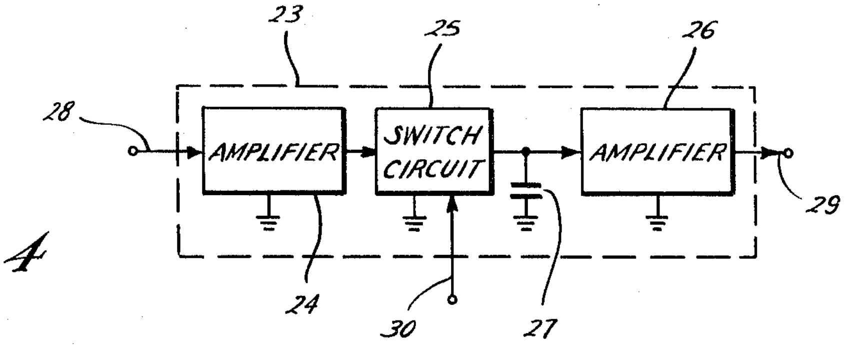
FIG. 4 is a block diagram illustrating in a simplified manner the principal elements of a follow and hold circuit used in the FIG. 1 embodiment.

Referring to FIG. 4, the follow and hold circuit 23 there shown includes in cascade an input amplifier 24, a switch circuit 25 and an output amplifier 26. A storage capacitor 27 is connected between the line running from switch circuit 25 to output amplifier 26 and a circuit ground point. The demodulated signal from delay line 22 is supplied by way of input line 28, while the signal supplied to the output filter 13 appears on the output line 29. Gating pulses or control pulses for controlling the switch circuit 25 are supplied thereto by way of line 30.

In the absence of a control pulse on line 30, switch circuit 25 is operative to pass signals from the input amplifier 24 to the output amplifier 26. When a control pulse is present on line 30, switch circuit 25 is disabled and does not pass any signals to the output amplifier 26. When switch circuit 25 is in its signal passing mode, the voltage across the storage capacitor 27 varies in accordance with the signal voltage appearing at the output of switch circuit 25. When switch circuit 25 is disabled, the voltage across the storage capacitor 27 remains fixed at the last-occurring value before the switch circuit 25 was disabled. Thus, capacitor 27 functions as a signal storage device when switch circuit 25 is disabled. In this regard, output amplifier 26 is of the high input impedance type for preventing discharge of the capacitor 27 when the switch circuit 25 is disabled. At such time, the impedance as seen looking back into the switch circuit 25 is also very high for the same reason. Thus, the storage capacitor 27 holds the last previous signal value when the switch circuit 25 is disabled during the occurrence of a control pulse on line 30.

The threshold extension device 12 further includes click detector circuitry 31 coupled to the output of the frequency-modulation demodulator 11 by way of the filter 20 for detecting the occurrence of demodulator click impulses and switching the follow and hold circuit 23 to its hold condition during the occurrence of each such impulse. The click detector circuitry 31 includes level detector circuit means represented by a positive click detector 32 for detecting the occurrence of positive-going impulses exceeding a first predetermined signal level in a positive-going direction and a negative click detector 33 for detecting the occurrence of negative-going impulses exceeding a second and lower predetermined signal level in a negative-going direction. In terms of FIG. 3B, the detection level for the positive click detector 32 is indicated at 34, while the detection level for the negative click detector 33 is indicated at 35. The upper detection level 34 is set just above the upper peak level for the combined signal plus Gaussian noise envelope. Similarly, the lower detection level 35 is set just below the lower peak level for the signal plus noise envelope. Detector 32 detects impulses which go above the upper level 34, while the detector 33 detects impulses which go below the lower level 35. Thus, both the positive-going and negative-going ones of the click impulses 19 are detected. Detectors 32 and 33 may take the form of Schmidt trigger circuits having their trigger levels set at the appropriate values.

When the positive click detector 32 detects a positive-going click impulse, it produces an output signal which triggers a pulse generator 36 which, in response thereto, produces a narrow output pulse of minimum fixed time duration, such duration being as long as the click lasts plus the delay line 22 time. Similarly, when the negative click detector 33 detects a negative-going click impulse it produces an output signal which triggers a pulse generator 37 which, in response thereto, produces a narrow output pulse of minimum fixed time duration, such duration being as long as the click lasts plus the delay line 22 time. The pulses from pulse generators 36 and 37 are of the same polarity. They are also of the same minimum pulse width or time duration, this duration being the same as or just slightly greater than the duration of each of the click impulses plus the delay time in the signal appearing at the output of the filter 20. The two sets of pulses from pulse generators 36 and 37 are supplied to a summing circuit 38 wherein they are combined into a single pulse train. Such pulse train is supplied by way of line 30 to the switch control input of the follow and hold circuit 23.

From the foregoing, it is seen that in the absence of a click type noise impulse in the signal at the output of the demodulator 11, such signal is transferred by way of filter 20, delay line 22 and follow and hold circuit 23 to the low-pass output filter 13. Upon the occurrence of a click-type noise impulse, such impulse is detected by one of the detectors 32 and 33 to trigger the corresponding pulse generator which, in turn, supplies a control pulse to the follow and hold circuit 23 for switching same to the hold condition for the duration of the noise impulse. In this hold condition, the follow and hold circuit 23 discontinues the transfer of the actual demodulated signal and instead transfers to the output filter 13 a signal value corresponding to the last previous signal value which existed at the output of delay line 22 prior to the appearance of the control pulse on line 30. After termination of the control pulse on line 30, the follow and hold circuit 23 resumes the transfer of the actual signal to the output filter 13.

The holding action of the follow and hold circuit 23 does two things. First, it prevents passage of click impulses to the low-pass filter 13. Secondly, it fills in the holes or gaps which would otherwise be produced in the signal supplied to the filter 13 when passage of the actual signal is blocked. These holes are filled in with signal values corresponding to estimates of what the signal values would have been in the absence of the click impulses. Additional smoothing action is provided by the output filter 13 so that no noticeable discontinuities appear in the final output signal at terminal 14.

The delay line 22 compensates for the time lag between the instant of time that the beginning of a click impulse appears at the output of the filter 20 and the instant of time at which the click impulse reaches full amplitude so that it can be detected by the appropriate one of the click detectors 32 and 33. Preferably, the time delay is such that the follow and hold circuit 23 is switched to the hold mode just before the leading edge of the corresponding click impulse appears at the output of the dealy line 22.

Pulse generators 36 and 37 are constructed so that the time duration of the control pulses developed by these generators is such that the trailing edges of these control pulses either coincide with or occur slightly after the trailing edges of the corresponding click impulses appearing at the output of the delay line 22. In this regard, it is noted that the click impulses in the demodulated signal are usually of substantially the same time duration.

As mentioned, the filter 20 removes Gaussian-type noise impulses which may appear in the demodulated signal at the output of demodulator 11. These Gaussian impulses are part of the noise already present in the signal as it reaches the input of the demodulator 11. They are not generated by the click phenomena in the demodulator 11. They are of a high frequency character and hence can be eliminated by a filter having a relatively low frequency cutoff point. Their removal prevents erroneous operation of the click detector circuitry 31.

By eliminating the click-type noise impulses, the threshold extension device 12 serves to extend the threshold point of the demodulator system (demodulator 11 plus output filter 13) in the direction of the lower end of the amplitude spectrum so as to accommodate lower values of input signal-to-noise ratio. For the present example, the extended transfer characteristic for the demodulator system with the device 12 in operation is indicated by broken-line curve 39 of FIG. 2. The threshold level is extended down by a factor $\Delta T$ to a lower threshold value $T_2$. Over the upper portion 39*a* of the extended curve, normal operation of the demodulator system is obtained. In this $T_1$—$T_2$ range, the output signal at terminal 14 would be similar to that of FIG. 3A except that the click impulses 16 would be eliminated. For working embodiments of the apparatus built to date, threshold extensions of as much as two decibels have been readily obtained.

The embodiment of threshold extension device shown in FIG. 1 is particularly useful with frequency modulated signals wherein the peak amplitude of the signal at the output of the demodulator 11 remains fairly constant. This permits the use of level detectors in the click detector circuitry 31 having fixed detection levels. A typical situation where the embodiment of FIG. 1 might be used is at the output of the first frequency-modulation demodulator in an FM/FM type communication or telemetry system. In such case, the average peak amplitude at the output of the first demodulator would meet the requirement of being fairly constant.

Figure 5:
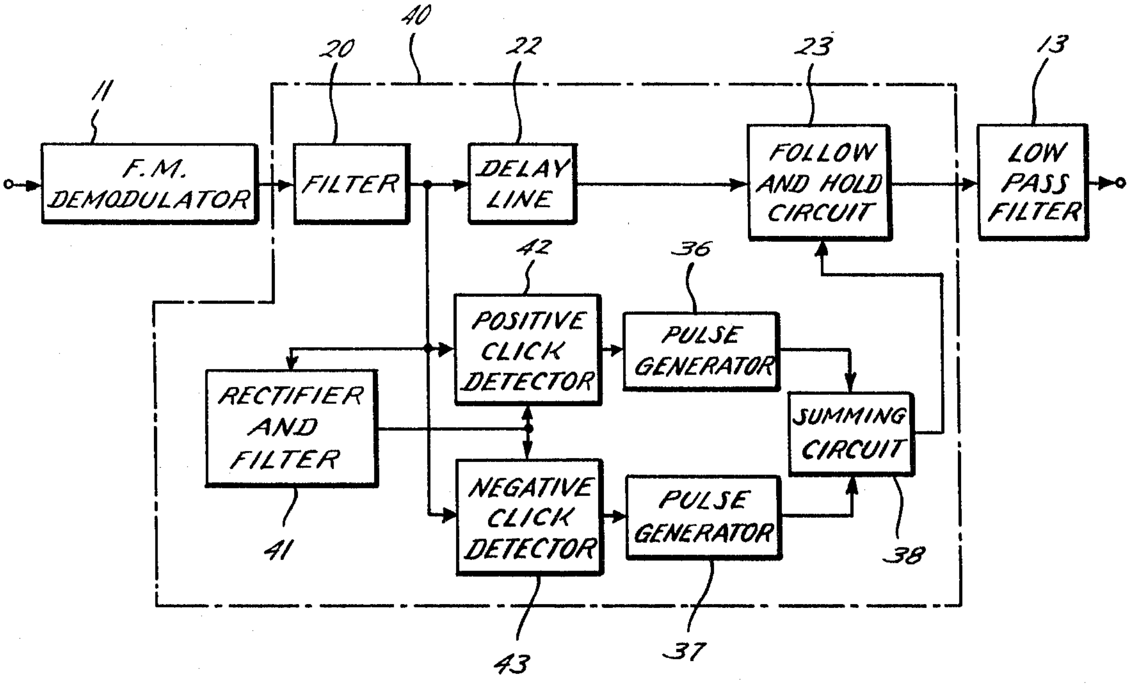
FIG. 5 shows a modified form of threshold extension device constructed in accordance with the present invention.

For cases where the average peak value of the signal at the output of the demodulator is subject to a substantial range of variation, the threshold extension device can be modified to accommodate such variation. A representative embodiment of a modified threshold extension device for accomplishing this purpose is illustrated in FIG. 5. As there indicated, the modified threshold extension device 40 is generally similar to the device 12 of FIG. 1, corresponding circuit elements being indicated by the same reference numerals. The device 40 differs, however, in that it further includes a rectifier and filter unit 41 having its input coupled to the output of the filter 20. Such rectifier and filter unit 41 is operative to develop a direct-current control signal having a magnitude value proportional to the average peak value of the signal plus Gaussian noise appearing at the output of the filter 20. This direct-current control signal or variable bias signal is supplied to positive and negative click detectors 42 and 43 for purposes of controlling the detection levels in these detectors 42 and 43. Detectors 42 and 43 are basically the same as the corresponding detectors considered in connection with FIG. 1 except that they are modified for purposes of receiving the variable bias signal from rectifier and filter unit 41. This variable bias signal is combined with a fixed bias signal in each of the detectors 42 and 43 to provide variable detection levels which remain slightly above and slightly below the upper and lower reaches of the signal plus Gaussian noise envelope. For the negative click detector 43, the variable bias signal from rectifier and filter 41 is combined with the fixed bias signal so that the detection level is decreased or moved downwardly as the average peak signal plus noise value increases. This can be accomplished by adding the variable bias to the fixed bias in an opposite polarity manner in the input circuitry of the detector 43.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

We claim:

1. A frequency-modulation demodulator threshold extension device for use intermediate the output of a frequency-modulation demodulator and the input of a demodulator output filter comprising:

first circuit means adapted to be coupled to the output of a frequency-modulation demodulator and having a first operating mode for transferring the demodulated signal to a demodulator output filter and having a second operating mode for discontinuing the transfer of the actual signal and instead transferring an estimated signal value based on a previous value of the actual signal; and second circuit means adapted to be coupled to the output of the frequency-modulation demodulator for detecting the occurrence of a demodulator click impulse and switching the first circuit means to its second operating mode during the occurrence thereof.

2. A threshold extension device in accordance with claim 1 wherein the first circuit means includes circuit means for delaying the demodulated signal to compensate for a slight time lag in the second circuit means.

3. A threshold extension device in accordance with claim 1 wherein the first circuit means includes follow and hold circuit means for transferring the actual signal to the demodulator output filter during the first operating mode and for holding the signal value at the input of the output filter at its last previous first mode value during the second operating mode.

4. A threshold extension device in accordance with claim 3 wherein the first circuit means includes delay circuit means coupled intermediate the output of the demodulator and the input of the follow and hold circuit means for delaying the demodulated signal to compensate for a slight time lag in the second circuit means.

5. A threshold extension device in accordance with claim 1 wherein the second circuit means includes level detector circuit means for detecting the occurrence of impulses exceeding a predetermined signal level and circuit means coupled to the first circuit means for switching the first circuit means to the second operating mode during the occurrence of each such impulse.

6. A threshold extension device in accordance with claim 5 and including circuit means coupled to the output of the frequency-modulation demodulator for supplying a variable bias signal to the level detector circuit means for varying the detection level in accordance with the average peak value of the signal at the output of the demodulator.

7,. A threshold extension device in accordance with claim 1 wherein the second circuit means includes level detector circuit means coupled to the output of the frequency-modulation demodulator for detecting the occurrence of impulses exceeding a predetermined signal level and pulse generator circuit means coupled to the level detector circuit means for generating a control pulse upon the detection of each such impulse and wherein the first circuit means includes circuit means responsive to such control pulses for switching the first circuit mean means to the second operating mode during the occurrence of each such control pulse.

8. A threshold extension device in accordance with claim 1 wherein:

the first circuit means includes delay circuit means for delaying the demodulated signal and follow and hold circuit means coupled to the output of the delay circuit means for transferring the delayed signal to the demodulator output filter during the first operating mode and for holding the signal value at the input of the output filter at its last previous first mode value during the second operating mode; and the second circuit means includes level detector circuit means coupled to the output of the frequency-modulation demodulator for detecting the occurrence of impulses exceeding a predetermined signal level, pulse generator circuit means coupled to the output of the level detector circuit means for generating a control pulse upon the detection of each such impulse and circuit means for supplying such control pulses to the follow and hold circuit means for switching such follow and hold circuit means to the second operating mode during the occurrence of each such control pulse.

9. A threshold extension device in accordance with claim 1 wherein the first circuit means includes delay circuit means for delaying the demodulated signal, switch circuit means coupled to the output of the delay circuit means and having a first operating condition for passing the delayed signal during the first operating mode and a second operating condition for not passing the delayed signal during the second operating mode and storage capacitor means coupled to the output of the switch circuit means and to the input of the demodulator output filter for storing signals passed by the switch circuit means, the output of the second circuit means of claim 1 being coupled to the switch circuit means for controlling the operating condition thereof.

10. A threshold extension device in accordance with claim 9 wherein the second circuit means includes level detector circuit means for detecting the occurrence of impulses exceeding a predetermined signal level for switching the switch circuit means to its second operating condition during the occurrence of each such impulse.

11. A threshold extension device in accordance with claim 9 wherein the second circuit means includes level detector circuit means for detecting the occurrence of impulses exceeding a predetermined signal level, pulse generator circuit means coupled to the output of the level detector circuit means for generating a control pulse upon the detection of each such impulse and circuit means for supplying such control pulses to the switch circuit means for switching same to its second operating condition during the occurrence of each such control pulse.